March 19, 1968 H. D. SQUIRE 3,373,754
SELF-CLEANING OVEN
Filed Dec. 30, 1965
3 Sheets-Sheet 1

INVENTOR.
Herbert D. Squire
BY
Atty.

INVENTOR.
Herbert D. Squire
BY Nicholas A Camasto
Atty.

United States Patent Office 3,373,754
Patented Mar. 19, 1968

3,373,754
SELF-CLEANING OVEN
Herbert D. Squire, Galesburg, Ill., assignor to Admiral Corporation, Chicago, Ill., a corporation of Delaware
Filed Dec. 30, 1965, Ser. No. 517,686
2 Claims. (Cl. 134—58)

ABSTRACT OF THE DISCLOSURE

A self-cleaning oven employing a water impeller blade for violently dispersing cleaning fluid throughout the oven enclosure and for simultaneously comminuting dislodged food soil. A fan blade is coaxially mounted with the impeller blade for circulating warm air throughout the chamber to dry the oven after cleaning and for maintaining more uniform cooking temperatures.

DISCLOSURE

This invention in general relates to cooking ranges, and in particular to means for cleaning ovens associated with cooking ranges. More particularly, this invention is concerned with an inexpensive, yet effective means for removing and disposing of soils, spills, and splatterings in the baking compartment of a domestic range.

As is well known, one of the most objectionable household chores is cleaning the soil from the interior walls of an oven. This is especially objectionable in an electric range wherein a single compartment, the oven compartment, is used for both baking and broiling. The dual function of the oven compartment makes it particularly susceptible to the more-difficult-to-remove soils such as grease from broiling which is baked on the oven walls, baked-on and charred spills, and other foods coming in contact with the oven walls, and their subsequent burning thereon.

Many prior art devices and methods have been devised for easing or eliminating the manual task of cleaning the interior of an oven. One such method utilizes extremely high temperatures, much higher than those normally required for baking, to vaporize soil adhering to the oven walls. There are many difficulties attending this method of cleaning an oven. First, the high temperatures require special liner materials capable of functioning under such conditions. Second, exotic thermal insulators are necessary to insure retention of the input heat necessary to attain these high temperatures, while cooling means must be employed to prevent the exterior surfaces from reaching temperatures beyond those consistent with safety. Third, the oven must either be adequately vented to the outdoors, or the user must content with odors, fumes, and possibly smoke, in the kitchen.

In order to surmount all of these difficulties, a rather expensive construction must be employed, which often places the initial purchase price of an automatic cleaning range beyond the capabilities of the consumer, not to mention the relatively high operational costs inherent in the power requirements necessary to obtain sufficient oven temperatures.

Other approaches and suggestions for easing the task of cleaning a soiled oven include various combinations of removable and/or disposable wall liners and synthetic coating materials noted for their non-adhering properties. In one instance it was suggested to apply a synthetic coating directly to the oven walls, thereby reducing manual effort required to remove soils. In another case, a synthetic coating was applied to a wall liner which could readily be removed from the oven and transported to an area more convenient for cleaning, such as a kitchen sink. An additional method suggested a disposable liner which could be replaced when soiled.

The liner and coating methods of improving cooking ovens have many problems such as expense; alteration of the emissivity of the interior oven walls; durability of the coating materials to heat, scratching, and wear; and the fact that manual handling and cleaning are required, even though the effort is reduced.

This invention, through a novel combination of elements and design, overcomes many difficulties inherent in prior art automatic, and semi-automatic, cleaning ovens. It basically comprises a water tight depression or sump forming the bottom wall of an oven, and liquid dispersion means located in the oven for dispersing fluid throughout the oven compartment. Provisions are made to retain the liquid within the oven cavity during a cleaning cycle, and completely automatic fill and drain equipment may, or may not, be integrated in the oven, primarily depending upon economics and market trends.

In addition, this invention utilizes means integral with the liquid dispersion means for improving the baking characteristics of an oven by providing a more uniform temperature throughout the oven compartment. Specifically, a fan for circulating heated air around the oven is located atop the liquid dispersion means. This fan is primarily provided to dry the oven walls after cleaning, but with a minor addition to the switching controls, namely a switch, it may be used during baking. More uniform oven temperatures decrease the total time required for cooking, and result in a better end product.

The primary object of this invention is to provide a simple, economical, trouble-free and effective apparatus for removing soil from the interior walls of a domestic baking oven.

Another object of this invention is to provide means for effectively cleaning an oven without excessive oven temperatures and the attendant construction problems, and also without the inconvenience of removable side panels.

Still another object of this invention is to provide fluid dispersion apparatus within a domestic baking oven for removing soil from the interior walls thereof.

An additional object of this invention is to provide means for dispersing a liquid cleaning agent within a domestic baking oven to remove soil from the interior walls thereof, and for forcibly distributing heated air about the interior thereof to dry said walls.

It is also an object of this invention to provide fan means integral with the liquid dispersion means, and rotative by a single motor, for improving the baking characteristics of an oven by circulating heated air about the interior thereof.

A feature of this invention resides in the design and attitude of a fan blade which allows minimum interference with a fluid dispersion impeller rotative therewith, and wherein the fan blade is capable of circulating heated air primarily in a lateral direction.

An additional feature of this invention is an oven sidewall construction capable of supporting movable and removable oven baking racks, while presenting a minimum horizontal, soil catching area.

An advantage of this invention resides in its economical manufacture and resultant economy to the consumer, while effectively removing soil from the interior of an oven.

Other objects and advantages of this invention will become apparent upon an examination of the following description taken in conjunction with the accompanying drawing wherein.

Figure 1:
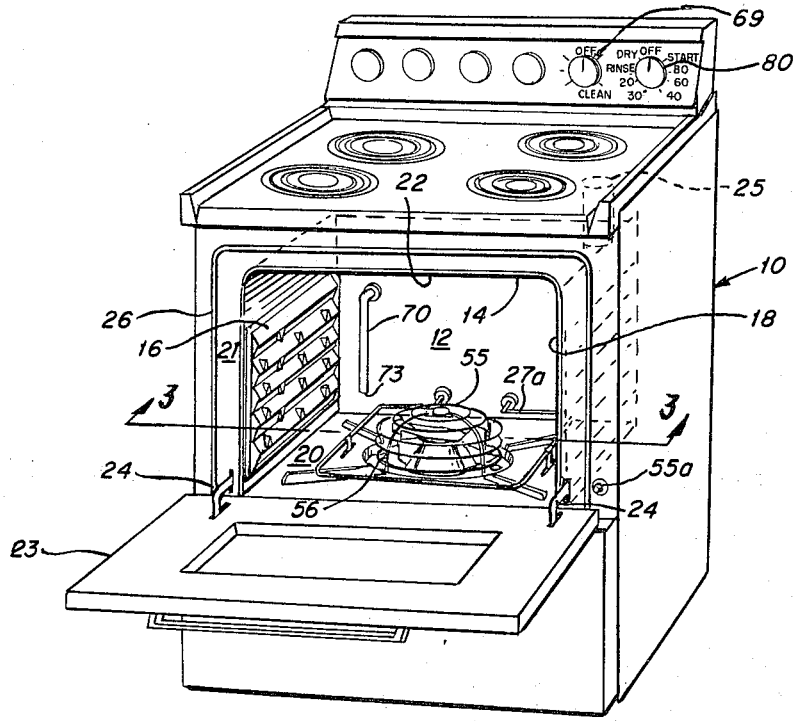
FIG. 1 is a perspective view of a free-standing domestic cooking range having its oven access door in the open position to clearly show the location of the liquid dispersing apparatus.

Turning to consideration of the drawings and in particular to FIG. 1, there is shown a free-standing electric range 10 which includes an oven compartment 12 comprising a top wall 14, sidewalls 16 and 18, and a bottom wall or pan 20. A front surface 21 of the range defines an oven compartment opening 22. An access door 23 is mounted and pivotably adjustable by hinges 24 to maintain a closing relationship with opening 22. A suitable resilient gasket 26 is affixed to front surface 21 adjacent the oven compartment opening, for maintaining a liquid impervious seal between the oven compartment and access door during cleaning, although a vent 25 is provided to allow the escape of moisture during baking. An electrical resistance heater 27a is mounted on bottom pan 20 in a manner well known in the art to provide baking temperatures in the oven.

Figure 2:
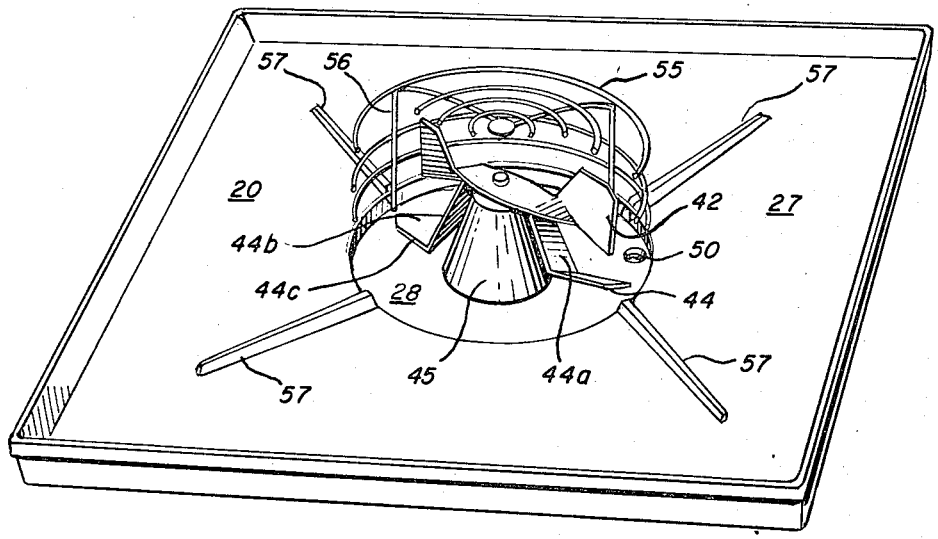
FIG. 2 is an enlarged perspective view of the oven bottom pan more clearly showing the liquid dispersing apparatus, guard, and ribs or food soil guides.
Figure 3:
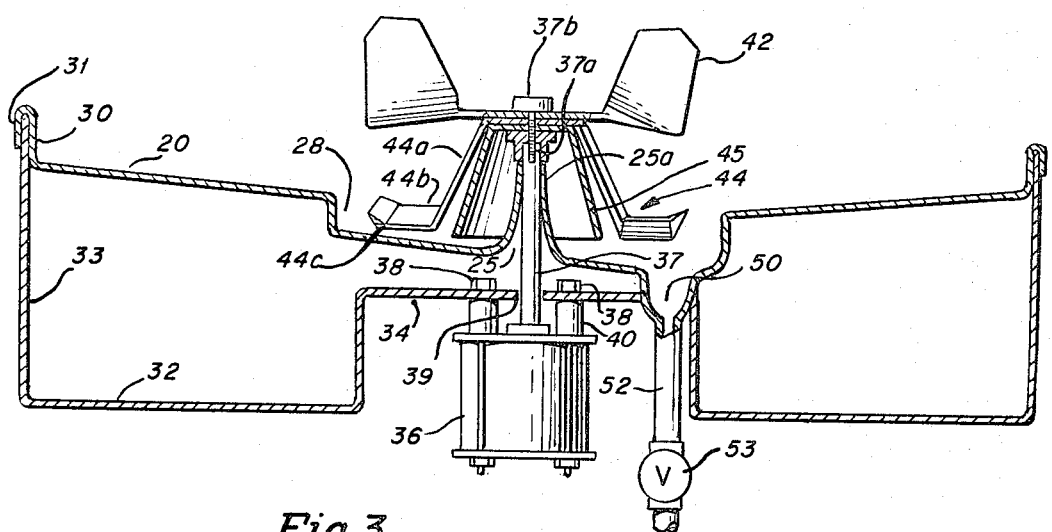
FIG. 3 is a partial cross section view taken along line 3—3 of FIG. 1 showing the combination liquid dispersing apparatus and fan, the sump construction, motor, and drain location.

Bottom pan 20, most clearly seen in FIGS. 2 and 3 includes an inclined outer area 27 forming a drain or run-off into a center depressed sump portion 28. An aperture 50 through the center of the sump is surrounded by an upright, hollow, flared collar 25a. The periphery of bottom pan 20 is folded into an upwardly extending lip 30 having a return bend 31, thereby forming a water tight basin. A pan supporting framework 32, having sides 33, supports the bottom pan at the return bend and also includes an upwardly-stepped motor mount 34 from which an electric motor 36 depends by bolts 38 and shock absorbing pads 40 to reduce vibration.

The electric motor is mounted as close to the bottom pan as practicable to conserve space for a drawer or other device below the oven.

Motor mount 34 is provided with a hole 39 coaxial with the aperture 25 and flared collar 25a. A rotatable motor shaft 37, having an internally threaded end 37a, extends vertically from the electric motor through hole 39, aperture 25, and above flared collar 25a.

An air-moving fan 42, water dispersing and soil comminuting impeller 44, and cone shaped water shield 45 are secured to the threaded end of motor shaft 37 by a threaded fastener 37b. The impeller, formed of sheet metal or the like, has two opposed members each comprising a downwardly sloped, depending leg 44a terminating in a wing shaped blade 44b having a sharpened leading edge 44c. The blade is rotated counter-clockwise (FIG. 2) with its lower edge skimming slightly above the bottom of sump 28, below the level of pan 20.

As will be more clearly seen later, the impeller structure, particularly the blade, performs two functions. First, the blade is designed to forcefully scatter the cleaning liquid, which initially fills the sump, towards the walls and top. This liquid dispersion is very important in that the pattern must adequately cover the entire oven interior and impinge on the oven walls with sufficient force to dislodge soil adhering thereto. After hitting the walls the cleaning liquid and soil loosened thereby drain back to the sump.

Second, the sharp edge of the blade reduces the size of larger pieces of soil which have been dislodged from the oven walls by the dispersion of cleaning liquid. These pieces of soil are carried to the sump, and into the path of the blades, by the cleaning liquid. The blades chop or comminute the soil (particularly burned and caked food), into small particles capable of being flushed down a drain.

Fan 42 has two blades orientated 180 degrees to each other which are designed to laterally circulate heated air about the oven interior. It is positioned above the impeller and must be carefully placed to minimize interference with the impeller's liquid dispersion pattern. A fan and impeller combination having blades stacked and vertically aligned, substantially as shown in FIG. 3, has been found to produce a suitable liquid dispersion pattern and adequate air circulation.

The fan, in conjunction with the electric heating element, is useful to rapidly dry the interior oven walls subsequent to rinsing the cleaning liquid from the oven. As an added feature, the fan can be used during baking to achieve a more uniform oven temperature by circulating heated air about the interior. An electric switch 71 (FIG. 6) by-passing the cleaning control circuit, to be explained below, is used to control the fan motor during baking.

The cone shaped water shield 45 is located beneath the fan and impeller and rotates with the motor shaft but within the confines of the impeller. In addition to giving the impeller and fan structure a decorative appearance, the shield prevents water from splashing over the top of collar 25a and spilling on to the electric motor.

Depressed sump 28 (the container-like area in the center of bottom pan 20), includes a bottom having a drain 50. The drain is connected to a drain pipe 52 from which the cleaning liquid and soil may be disposed in several ways, such as directing it to a sewage pipe, or disposal pan. A solenoid operated outlet valve 53, is interposed in the drain pipe between the opening and the outlet to control the time of discharge.

A metal fan guard 55, fastened to the bottom by legs 56 (FIGS. 1 and 2), encloses the fan and impeller blades to prevent injuries which might be sustained from a utensil or body member accidently coming in contact therewith. As an additional safety feature, an electric interlock switch 55a is serially connected with a power source and the electric motor to disconnect the motor upon opening the oven access door.

Guide members or ribs 57 in the illustrated embodiment comprise raised, tapered segments formed from the pan surface and extending diagonally thereon from the sump towards each corner. These ribs direct soil, such as burnt food which has been washed down the oven walls, towards the impeller blades to be cut into small particles suitable for discarding down drain 50.

Figure 4:
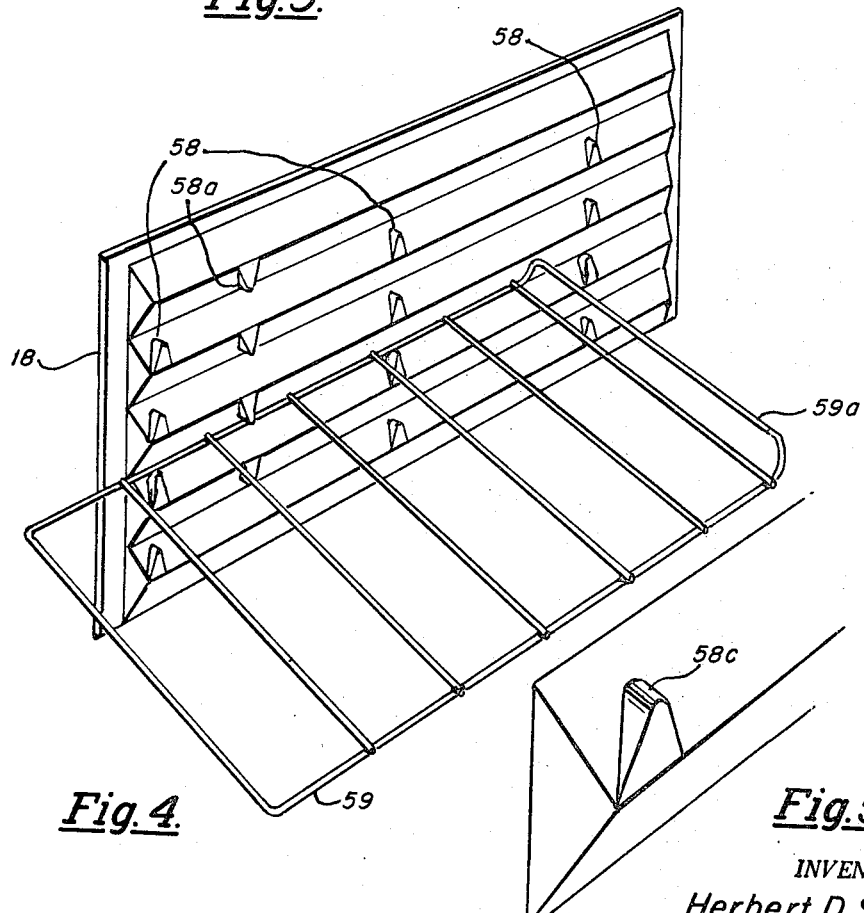
FIG. 4 is an enlarged perspective view of the oven sidewall construction showing the location and general configuration of the oven rack supports and stop tabs.
Figure 5:
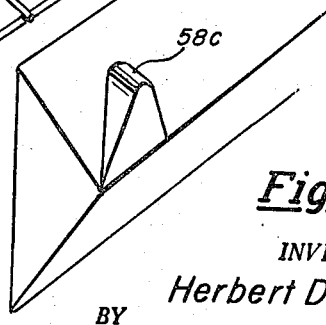
FIG. 5 is a further enlarged perspective view showing an oven rack support in greater detail.

Oven sidewalls 16 and 18 (sidewall 18 is best seen in FIGS. 4 and 5) are specifically designed to have a minimum flat, horizontal area, which area is difficult to free of food, soil and water collected thereon. They are fabricated from sheet metal or the like in a two step operation by first stamping the metal to form a three dimensional sawtooth pattern and then pressing a plurality of oven supporting projections 58 from the surface of said pattern. These projections are arranged in a series of horizontal rows at several vertical levels to allow vertical adjustment of a slidable oven rack 59. Stop tabs 58a, also pressed from sidewall 18, are located just behind the most forward oven rack projection, and catch an upturned end 59a of the oven rack.

The oven rack support projections present an upwardly facing, rounded surface 58c which tapers outwardly at the sides. It is virtually impossible for soil to lodge on a projection of this configuration, and consequently washing and rinsing of the oven interior is simplified, and manual clean-up minimized.

Water for cleaning and rinsing the oven is obtained from the home water supply preferably by a direct connection therefrom, to a water supply pipe 70 which discharges from an outlet end 73. The outlet end is located at the oven rear, just above bottom pan 20 and a sufficient quantity of water is allowed to enter the pan to substantially fill sump 28. The exact quantity of water is controlled by a solenoid operated inlet valve 72 regulated by an electric timer 80, to be explained in greater detail hereinafter.

Figure 6:
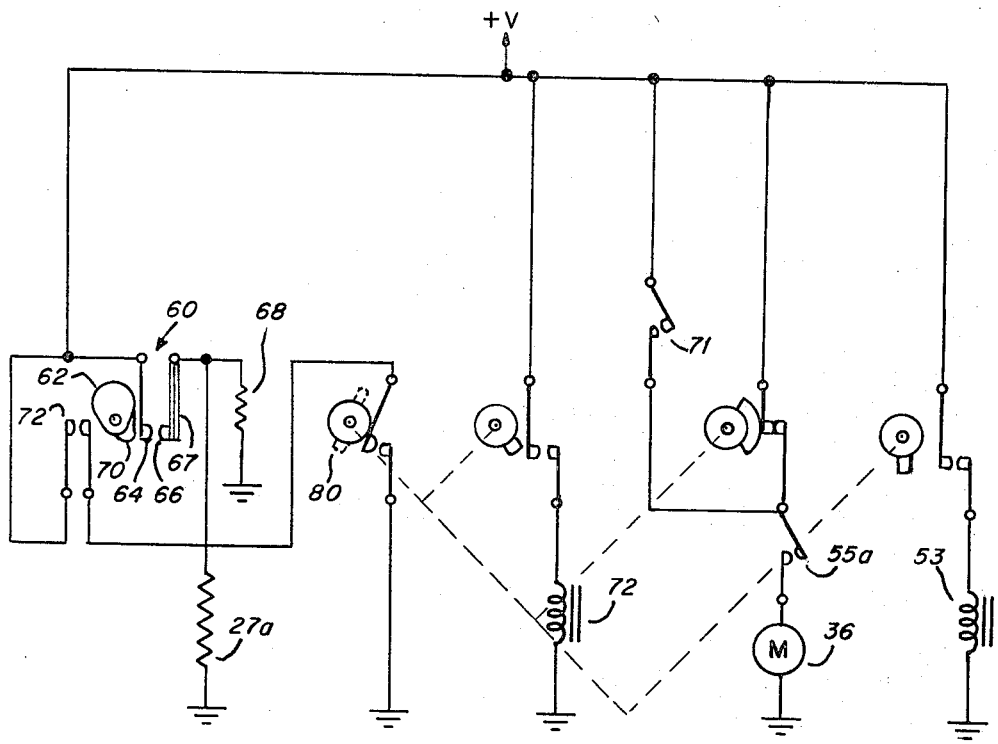
FIG. 6 is a schematic diagram of a simplified electrical circuit showing the interconnection of the more important operating elements with the cleaning cycle timing mechanism.

Referring to FIG. 6, a combination thermostat and range on-off switch 60 is serially connected to electrical resistance heater 27a and is controlled by a rotatable mechanical cam 62 located adjacent one movable contact 64 of said switch. The remaining contact 66 of the combination thermostat and switch is affixed to the end of a bimetallic strip 67 in thermal contact with a resistor 68, parallelly connected to heater 27a. The temperature of resistor 68 is directly proportional to the temperature of the electrical resistance heater and the heat from the resistor causes the bimetallic strip and contact 66 to warp away from contact 64, breaking the existing electrical connection and providng a simple thermostatic control.

The mechanical cam 62 is rotated by a thermostat knob 69 on the oven control panel and includes a protrusion 70 for engaging a timer switch 72 when the cam is adjusted to a pre-set "clean" position, which corresponds to a low oven temperature. Timer switch 72 is serially connected to an electric timer 80 which consequently can only function when the thermostat is adjusted to the pre-set clean position. The thermostat also maintains the low interior oven temperature during the cleaning cycle. Electric timer 80 may comprise a conventional group of cam driven on-off switches for sequentially energizing water inlet valve 72, electric motor 36, oven resistance element 27a and drain valve 53.

OPERATIONAL CYCLE

A suitable detergent or cleaning agent is deposited on the bottom of the oven pan preferably in sump 28. This step may be manually performed or suitable automatic dispensing means, not shown, may readily be employed. As the oven thermostat is pre-set to the clean position, which as explained above turns on the electric resistance heater and operates the oven at a low temperature level, timer 80 commences operation through the closing of switch contacts 72. The timer initially closes drain valve 53 and opens water valve 72 to allow a predetermined quantity of water to fill the sump. The timer then closes the water inlet valve and starts motor 36 which rotates the combination fan and impeller blades to begin the actual fluid dispersion. The length of this operation of the cleaning cycle is controlled by the timer which preferably may be set for different time durations.

At this point the temperature of the water and oven interior is controlled by thermostat 60 which is also used during normal baking operations. The rotating impellers 44 dip into the mixture of water and cleaning agent in the sump, and fling it violently against the oven sidewalls, top, and bottom. The combination of the mixture of heated water, cleaning agent, and the force of the water impinging against the oven interior loosens soil accumulated thereon and washes it towards the bottom pan and the sump. Bouyant pieces of food which are washed to the bottom pan are directed by the guide ribs into the path of the impeller blades. The sharpened edges of the impeller blades comminute these pieces of food into particles small enough to be rinsed down the drain.

After the washing cycle has continued for the pre-set time interval, the electric timer turns off the electric motor and heating element, and opens drain valve 53 thereby allowing the water, food soil, and grease to drain from the sump.

The next step is to rinse the oven interior to remove any detergent film or loose food particles remaining therein. This is accomplished by introducing clear water into the sump, through water supply line 70, and allowing the impellers to operate for a short period of time. The rinse water is now drained from the sump and with the resistance heaters still on, and the electric motor operating, fan 42 circulates warm air about the oven interior thereby accelerating drying of the interior surfaces.

What has been described is an effective and economical apparatus for cleaning the inside of a domestic cooking oven and means in combination therewith for circulating heated air about the cooking compartment for improved cooking characteristics.

It is obvious that upon study by those skilled in the art, the disclosed invention may be altered or modified both in physical appearance and construction without departing from its inventive concept. Therefore, the scope of protection to be given this invention should not be limited by the embodiment described above, but should be determined by the essential descriptions thereof which appear in the appended claims.

The embodiments of the invention in which an exclusive property or privilege is claimed are defined as follows:

1. A self-cleaning oven comprising: a cooking enclosure including top, bottom and side walls, a hinged access door; sealing means rendering said enclosure substantially water tight when said access door is closed; a vent between said cooking enclosure and the atmosphere; an electric heating element in said chamber; a range switch and a thermostat for controlling energization of said heating element; inlet means introducing cleaning fluid into said enclosure; a centrally located sump in said bottom wall; said bottom wall being tapered toward said sump and including a pair of raised surfaces formed therein for guiding fluid and dislodged food soil toward said sump; a motor operated impeller blade mounted in said sump, said impeller blade adapted to violently disperse cleaning fluid against the interior surfaces of said chamber and having sharp leading edges for comminuting dislodged food soil; drain valve means coupled to said sump for removing fluid and comminuted food soil from said chamber; a fan blade coaxially mounted with said impeller blade, in substantially noninterfering attitude therewith, for directing air outwardly along said bottom wall and upwardly along said side walls; program means controlling operation of said inlet valve, said motor operated impeller blade, said heating element and said drain valve means and including a timer switch operable only when said range switch is set to a predetermined temperature for heating said enclosure during cleaning; and means energizing said motor operated impeller during cooking cycles whereby said fan blade circulates air to provide more uniform temperatures in said chamber with consequent shortening of cooking times.

2. The self-cleaning defined by claim 1 wherein said side walls are formed with a sawtooth surface configuration including a plurality of cooperating shelf supports at different vertical levels for supporting removable horizontal shelves; said side walls and said shelf supports being designed to present minimum horizontal surface aid in dislodging food soil therefrom.

References Cited

UNITED STATES PATENTS

| | | | |
|---|---|---|---|
| 1,658,413 | 2/1928 | Patelski. | |
| 2,047,177 | 7/1936 | Davis | 134—115 X |
| 2,422,022 | 6/1947 | Koertge | 134—94 |
| 3,080,874 | 3/1963 | Brucken | 134—115 |
| 3,082,779 | 3/1963 | Jacobs | 134—115 X |
| 3,084,701 | 4/1963 | Hardy et al. | 134—115 |
| 3,329,529 | 7/1967 | Lamar | 134—22 |

CHARLES A. WILLMUTH, *Primary Examiner.*

ROBERT L. BLEUTGE, *Examiner.*